United States Patent Office 3,505,336
Patented Apr. 7, 1970

3,505,336
**3,4-DIHYDRO-2-(1H)-ISOQUINOLINECARBOXAMI-
DOXIMES AND LOWER-ALKANOATES**
Denis M. Bailey, East Greenbush, N.Y., assignor to Sterling Drug Inc., New York, N.Y., a corporation of Delaware
No Drawing. Filed May 6, 1968, Ser. No. 727,065
Int. Cl. C07d 35/38, 35/34; A61k 27/00
U.S. Cl. 260—287       8 Claims

ABSTRACT OF THE DISCLOSURE 3,4 - dihydro - 2(1H) - isoquinolinecarboxamidoximes and lower-alkanoate derivatives, having hypotensive activity, are prepared by reacting the corresponding 3,4-dihydro - 2(1H)-isoquinolinecarbonitrile with hydroxylamine and by further reacting said carboxamidoxime with one or two molar equivalents of a lower-alkanoylating agent to form the O-mono-(lower-alkanoate) or N,O-di-(lower-alkanoate), respectively, of said carboxamidoxime.

---

This invention relates to compositions of matter known in the art of chemistry as substituted-isoquinolines and their preparation.

The invention sought to be patented, in its composition aspect, resides in the compounds which I designate as 3,4-dihydro-2(1H)-isoquinolinecarboxamidoximes optionally mono-substituted or di-substituted by lower-alkanoyl, respectively, at the oxygen atom or the oxygen atom and the terminal nitrogen atom of the carboxamidoxime moiety. The substitution of simple moieties on the benzene ring of the isoquinoline ring, i.e., at the 5-, 6-, 7- or 8-positions, or the substitution of lower-alkyl at the 1- and/or 3-positions of the isoquinoline ring does not adversely affect the pharmacological activity of the compounds. Illustrative but not limitative examples of such simple moieties are lower-alkyl, lower-alkoxy, halo, lower-alkylmercapto, lower-alkylsulfonyl, benzyloxy, trihalomethyl, lower-alkanoylamino, nitro and the like. Embodiments of the composition aspect of the invention, when tested according to standard pharmacological evaluation procedures in animals, have been found to possess the inherent applied use characteristics of exerting an antihyptertensive effective in animal organisms, thereby indicating their utility as hypotensive agents.

The invention sought to be patented, in its process aspect, resides in the process of preparing said 3,4-dihydro - 2(1H) - isoquinolinecarboxamidoximes which comprises reacting the corresponding 3,4-dihydro-2(1H)-isoquinolinecarbonitrile with hydroxylamine and, if desired, forming the O-mono-(lower-alkanoate) or N,O-di-(lower-alkanoate) of said carboxamidoxime by further reacting it with one or two molar equivalents of a lower-alkanoylating agent.

Without limiting the generality of the foregoing, illustrative and preferred embodiments of the 3,4-dihydro-2(1H)-isoquinolinecarboxamidoximes of the invention are the compounds of Formula I:

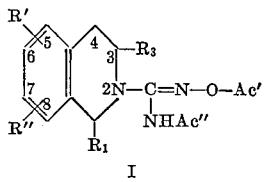

I where $R_1$ and $R_3$ are each hydrogen or lower-alkyl, $R'$ and $R''$ are each hydrogen, lower-alkyl, lower-alkoxy or halo, and Ac' and Ac'' are each hydrogen or lower-alkanoyl.

The term "lower-alkyl," as used herein, means an alkyl radical having from one to six carbon atoms inclusive, illustrated by methyl, ethyl, isopropyl, n-propyl, n-butyl, sec-butyl, isobutyl, n-amyl, n-hexyl, and the like.

The term "lower-alkoxy," as used herein, means an alkoxy radical having from one to six carbon atoms inclusive, illustrated by methoxy, ethoxy, n-propoxy, isopropoxy, n-butoxy, sec-butoxy, isobutoxy, n-hexoxy, and the like.

The term "halo," as used herein, means chloro, bromo, iodo or fluoro.

The term "lower-alkanoyl," as used herein, means alkanoyl radicals having from two to six carbon atoms inclusive which can be arranged as straight or branched chains, among which are, for purposes of illustration but without limiting the generality of the foregoing, acetyl, propionyl (n-propanoyl), isobutyryl (2-methyl-n-propanoyl) and caproyl (n-hexanoyl).

In the process of the invention, as illustrated for preferred embodiments, compounds of Formula I where Ac' and Ac'' are each hydrogen are prepared by reacting with hydroxylamine the corresponding 3,4-dihydro-2(1H)-isoquinolinecarbonitrile of the Formula II:

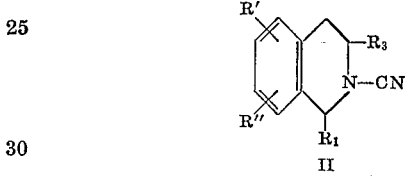

II where $R_1$, $R_3$, $R'$ and $R''$ are the meanings given above for Formula I. The compounds of Formula I where Ac' is lower-alkanoyl and Ac'' is hydrogen or lower-alkanoyl are prepared by reacting the compound of Formula I where Ac' and Ac'' are each hydrogen with one or two (or more) molar equivalents of a lower-alkanoylating agent to form, respectively, its O-mono-(lower-alkanoate), i.e., where Ac' is lower-alkanoyl and Ac'' is hydrogen, or its N,O-di-(lower-alkanoate), i.e., where Ac' and Ac'' are each lower-alkanoyl.

The 3,4-dihydro-2(1H)-isoquinolinecarboxamidoximes of the invention are useful in the free base form or in the form of their acid-addition salts. The acid-addition salts are simply a more convenient form for use; and, in practice, use of the salt form inherently amounts to use of the base form. The acids which can be used to prepare the acid-addition salts are preferably those which produce, when combined with the free base, pharmaceutically acceptable salts, that is, salts whose anions are relatively innocuous to the animal organism in pharmaceutical doses of the salts, so that the beneficial properties inherent in the free base are not vitiated by side effects ascribable to the anions; in other words, the latter do not substantially affect the pharmaceutical properties inherent in the cations. Appropriate pharmaceutically acceptable salts within the scope of the invention are preferably those derived from mineral acids such as hydrochloric acid, hydrobromic acid, hydriodic acid, nitric acid, phosphoric acid, sulfamic acid, and sulfuric acid; and organic sulfonic acids such as methanesulfonic acid, ethanesulfonic acid, benzenesulfonic acid, p-toluenesulfonic acid, naponic acid (1,4-naphthalenedisulfonic acid), and the like, giving the hydrochloride, hydrobromide, hydriodide, nitrate, phosphate, sulfamate, sulfate, methanesulfonate, ethanesulfonate, benzenesulfonate, p-toluenesulfonate and naponate, respectively.

The acid-addition salts are prepared preferably by reacting the free base and acid in an organic solvent, e.g., ethanol, 2-propanol, acetone, etc., in which case the salt separates directly or can be obtained by concentration of the solution.

The molecular structures of the 3,4-dihydro-2(1H)-isoquinolinecarboxamidoximes of the invention are assigned on the basis of evidence provided by infrared (IR) and nuclear magnetic resonance (NMR) spectra, and, by the correspondence of calculated and found values for the elementary analyses for representative examples.

The manner of making and using our invention will now be generally described so as to enable the person skilled in the art of organic chemistry to make and use the same.

The 3,4-dihydro-2(1H)-isoquinolinecarboxamidoximes of the invention are prepared by reacting the corresponding 3,4-dihydro-2(1H)-isoquinolinecarbonitrile with hydroxylamine. The reaction is conveniently and preferably carried out by mixing the reactants in a suitable solvent at room temperature (about 25-30° C.) and then heating (about 75-100° C. or higher) if necessary. Suitable solvents are organic solvents, e.g., methanol, ethanol, dimethylformamide, tetrahydrofuran, and the like.

The reaction of the 3,4-dihydro-2(1H)-isoquinolinecarboxamidoximes with a lower-alkanoylating agent to form the O-mono-(lower-alkanoate), i.e., where Ac' is lower-alkanoate and Ac" is hydrogen, is carried out preferably by using one molar equivalent of a lower-alkanoyl chloride per mole of carboxamidoxime. The reaction of the 3,4-dihydro-2(1H)-isoquinolinecarboxamidoxime with a lower-alkanoylating agent to form the N,O-di-(lower-alkanoate), i.e., where Ac' and Ac" are each lower-alkanoyl, is carried out preferably by using two or more molar equivalent quantities of a lower-alkanoic anhydride per mole of carboxamidoxime.

The intermediate 3,4-dihydro-2(1H)-isoquinolinecarbonitriles are prepared by well-known methods, e.g., by reacting the corresponding known 1,2,3,4-tetrahydroisoquinoline with cyanogen bromide.

The best mode contemplated for carrying out the invention will now be set forth, as follows:

(A) 3,4-DIHYDRO-2(1H)-ISOQUINOLINE-CARBONITRILE (1) 3,4-dihydro-2(1H)-isoquinolinecarbonitrile To a stirred solution containing 39.9 g. of 1,2,3,4-tetrahydroisoquinoline and 49.2 g. of anhydrous sodium acetate in 750 ml. of methanol chilled below 10° C. was added dropwise a solution of 36.0 g. of cyanogen bromide in 500 ml. of methanol. The clear yellow solution was allowed to stand overnight and was then evaporated under reduced pressure to remove the solvent. The residue was taken up in ether and water and the layers separated. The aqueous layer was extracted once with ether. The combined ether extracts were washed successively with cold dilute aqueous hydrochloric acid, dilute aqueous sodium bicarbonate solution and water. The ether solution was dried over anhydrous potassium carbonate and evaporated under reduced pressure to yield 41.1 g. of 3,4-dihydro-2(1H)-isoquinolinecarbonitrile, which crystallized on cooling.

(2) 3,4-dihydro-1-methyl-2(1H)-isoquinolinecarbonitrile

An oil, 20.8 g., was prepared following the procedure described in Example A-1 using 18.3 g. of 1,2,3,4-tetrahydro-1-methylisoquinoline and 20.5 g. of anhydrous sodium acetate in 175 ml. of methanol, and 14.4 g. of cyanogen bromide in 50 ml. of methanol.

(3) 3,4-dihydro-3-methyl-2(1H)-isoquinolinecarbonitrile 29.3 g., was prepared as in Example A-1 using 25.9 g. of 1,2,3,4-tetrahydro-3-methylisoquinoline and 29 g. of anhydrous sodium acetate in 225 ml. of methanol, and 20.5 g. of cyanogen bromide in 100 ml. of methanol.

(4) 3,4-dihydro-6,7-dimethoxy-2(1H)-isoquinolinecarbonitrile 10.1 g., was prepared as in Example A-1 using 19.3 g. of 1,2,3,4-tetrahydro-6,7-dimethoxyisoquinoline and 16.4 g. of anhydrous sodium acetate in 175 ml. of methanol, and 11.7 g. of cyanogen bromide in 75 ml. of methanol.

Following the procedure described in Example A-1 using a molar equivalent quantity of the appropriate substituted 1,2,3,4-tetrahydroisoquinoline in place of 1,2,3,4-tetrahydroisoquinoline, there are obtained the following substituted-3,4-dihydro-2(1H)-isoquinolinecarbonitrile:

3,4-dihydro-6-methoxy-2(1H)-isoquinolinecarbonitrile using
1,2,3,4-tetrahydro-6-methoxyisoquinoline;
3,4-dihydro-5,6-dimethoxy-2(1H)-isoquinolinecarbonitrile using
1,2,3,4-tetrahydro-5,6-dimethoxyisoquinoline;
3,4-dihydro-7-methyl-2(1H)-isoquinolinecarbonitrile using
1,2,3,4-tetrahydro-7-methylisoquinoline;
6,7-diethoxy-3,4-dihydro-2(1H)-isoquinolinecarbonitrile using
6,7-diethoxy-1,2,3,4-tetrahydroisoquinoline;
6-ethoxy-3,4-dihydro-2(1H)-isoquinolinecarbonitrile using
6-ethoxy-1,2,3,4-tetrahydroisoquinoline;
6-ethoxy-3,4-dihydro-7-methoxy-2(1H)-isoquinolinecarbonitrile using
6-ethoxy-1,2,3,4-tetrahydro-7-methoxyisoquinoline;
6-ethoxy-3,4-dihydro-7-methoxy-1-methyl-2(1H)-isoquinolinecarbonitrile using
6-ethoxy-1,2,3,4-tetrahydro-7-methoxy-1-methylisoquinoline;
6-ethoxy-3,4-dihydro-1-methyl-2(1H)-isoquinolinecarbonitrile using
6-ethoxy-1,2,3,4-tetrahydro-1-methylisoquinoline;
1-ethyl-3,4-dihydro-6,7-dimethoxy-2(1H)-isoquinolinecarbonitrile using
1-ethyl-1,2,3,4-tetrahydro-6,7-dimethoxyisoquinoline;
3,4-dihydro-6,7-dimethoxy-1,3-dimethyl-2(1H)-isoquinolinecarbonitrile using
1,2,3,4-tetrahydro-6,7-dimethoxy-1,3-dimethylisoquinoline;
3,4-dihydro-5,6-dimethoxy-1-methyl-2(1H)-isoquinolinecarbonitrile using
1,2,3,4-tetrahydro-5,6-dimethoxy-1-methylisoquinoline;
3,4-dihydro-6,7-dimethoxy-1-methyl-2(1H)-isoquinolinecarbonitrile using
1,2,3,4-tetrahydro-6,7-dimethoxy-1-methylisoquinoline;
3,4-dihydro-6,7-dimethoxy-3-methyl-2(1H)-isoquinolinecarbonitrile using
1,2,3,4-tetrahydro-6,7-dimethoxy-3-methylisoquinoline;
1-ethyl-3,4-dihydro-2(1H)-isoquinolinecarbonitrile using
1-ethyl-1,2,3,4-tetrahydroisoquinoline;
7-bromo-3,4-dihydro-2(1H)-isoquinolinecarbonitrile using
7-bromo-1,2,3,4-tetrahydroisoquinoline;
7-chloro-3,4-dihydro-2(1H)-isoquinolinecarbonitrile using
7-chloro-1,2,3,4-tetrahydroisoquinoline;
7-fluoro-3,4-dihydro-2(1H)-isoquinolinecarbonitrile using
7-fluoro-1,2,3,4-tetrahydroisoquinoline;
3,4-dihydro-7-iodo-2(1H)-isoquinolinecarbonitrile using
1,2,3,4-tetrahydro-7-iodoisoquinoline.

(B) 3,4-DIHYDRO-2(1H)-ISOQUINOLINE-CARBOXAMIDOXIMES (1) 3,4-dihydro-2(1H)-isoquinolinecarboxamidoxime A solution of hydroxylamine was prepared by dissolving 19.1 g. of hydroxylamine hydrochloride in 250 ml. of methanol and adding a solution of 14.0 g. of sodium methoxide in 100 ml. of methanol, keeping both solutions below 15° C. This solution was then filtered directly into a solution of 20.5 g. of 3,4-dihydro-2(1H)-isoquinolinecarbonitrile in 125 ml. of methanol. The resulting mixture was allowed to stand at room temperature for one hour and then refluxed for two and one half hours. The reaction mixture was then evaporated in vacuo to remove the solvent. The residue was extracted several times with boiling ether and the ether solution was filtered and evaporated in vacuo to remove the ether. The white solid thus obtained was recrystallized from isopropyl alcohol to yield 6.8 g. of 3,4-dihydro-2(1H)-isoquinolinecarboxamidoxime, M.P. 109–116° C.

A 12.9 g. portion of 3,4-dihydro-2(1H)-isoquinolinecarboxamidoxime was dissolved in 75 ml. of hot isopropyl alcohol and to the solution was added 68 ml. of 1 M p-toluenesulfonic acid in isopropyl alcohol. The solution was allowed to cool and the crystalline precipitate was collected and dried at 0.5 mm. at room temperature over sulfuric acid for about fifteen hours to yield 20.7 g. of 3,4 - dihydro-2(1H)-isoquinolinecarboxamidoxime -p-toluene sulfonate, M.P. 143.6–145.0° C. (corr.).

(2) 3,4-dihydro-1-methyl-2(1H)-isoquinolinecarboxamidoxime

To a stirred mixture containing 20 g. of anhydrous sodium carbonate, 7 g. of hydroxylamine hydrochloride and 50 ml. of dimethylformamide chilled in an ice bath was added 10.0 g. of 3,4-dihydro-1-methyl-2(1H)-isoquinolinecarbonitrile. The resulting reaction mixture was allowed to warm up to room temperature and then stirred for twenty-three hours. The reaction mixture was next warmed on a steam bath for one hour and filtered through a sintered glass funnel. The solids were washed with dimethylformamide and the washings combined with the filtrate. The combined filtrates were evaporated in vacuo to yield a solid, which was recrystallized once from acetonitrile and once from isopropyl alcohol to yield 6.0 g. of 3,4 - dihydro-1-methyl-2(1H)-isoquinolinecarboxamidoxime, M.P. 164–166° C. with decomposition. The compound is converted into its p-toluenesulfonate salt as in Example B–1.

(3) 3,4-dihydro-3-methyl-2(1H)-isoquinolinecarboxamidoxime

M.P. 117–121° C., 11.9 g., was prepared following the procedure described in Example B–2 using 40 g. of anhydrous sodium carbonate, 14 g. of hydroxylamine hydrochloride, 125 ml. of dimethylformamide and 17.2 g. of 3,4-dihydro-3-methyl-2(1H)-isoquinolinecarbonitrile. The product is converted into its p-toluenesulfonate as in Example B–1.

(4) 3,4-dihydro-6,7-dimethoxy-2(1H)-isoquinolinecarboxamidoxime

M.P. 148–151° C., 2.4 g., was prepared following the procedure described in Example B–2 using 7 g. of hydroxylamine hydrochloride, 20 g. of anhydrous sodium carbonate, 75 ml. of dimethylformamide and 9.9 g. of 3,4 - dihydro-6,7-dimethoxy - 2(1H) - isoquinolinecarbonitrile. The compound is converted into its p-toluenesulfonate as in Example B–1.

Following the procedure described in the Example B–1 using a molar equivalent quantity of the appropriate substituted-3,4-dihydro - 2(1H) - isoquinolinecarbonitrile in place of 3,4-dihydro-2(-H)-isoquinolinenitrile, there are obtained the following corresponding 3,4-dihydro-2(1H)-isoquinolinecarboxamidoximes,
3,4-dihydro-6-methoxy-2(1H)-isoquinolinecarboxamidoxime,
3,4-dihydro-5,6-dimethoxy-2(1H)-isoquinolinecarboxamidoxime,
3,4-dihydro-7-methyl-2(1H)-isoquinolinecarboxamidoxime,
6,7-diethoxy-3,4-dihydro-2(1H)-isoquinolinecarboxamidoxime,
6-ethoxy-3,4-dihydro-2(1H)-isoquinolinecarboxamidoxime,
6-ethoxy-3,4-dihydro-7-methoxy-2(1H)-isoquinolinecarboxamidoxime,
6-ethoxy-3,4-dihydro-7-methoxy-1-methyl-2(1H)-isoquinolinecarboxamidoxime,
6-ethoxy-3,4-dihydro-1-methyl-2(1H)-isoquinolinecarboxamidoxime,
1-ethyl-3,4-dihydro-6,7-dimethoxy-2(1H)-isoquinolinecarboxamidoxime,
3,4-dihydro-6,7-dimethoxy-1,3-dimethyl-2(1H)-isoquinolinecarboxamidoxime,
3,4-dihydro-5,6-dimethoxy-1-methyl-2(1H)-isoquinolinecarboxamidoxime,
3,4-dihydro-6,7-dimethoxy-1-methyl-2(1H)-isoquinolinecarboxamidoxime,
3,4-dihydro-6,7-dimethoxy-3-methyl-2(1H)-isoquinolinecarboxamidoxime,
1-ethyl-3,4-dihydro-2(1H)-isoquinolinecarboxamidoxime,
7-bromo-3,4-dihydro-2(1H)-isoquinolinecarboxamidoxime,
7-chloro-3,4-dihydro-2(1H)-isoquinolinecarboxamidoxime,
7-fluoro-3,4-dihydro-2(1H)-isoquinolinecarboxamidoxime,
3,4-dihydro-7-iodo-2(1H)-isoquinolinecarboxamidoxime, (C) 3,4-DIHYDRO-2(1H)-ISOQUINOLINECARBOXAMIDOXIME LOWER-ALKANOATES (1) 3,4-dihydro-2(1H)-isoquinolinecarboxamidoxime N,O-diacetate To a solution of 13.6 g. of 3,4-dihydro-2(1H)-isoquinolinecarboxamidoxime in 50 ml. of pyridine cooled to about 15–20° C. was added with stirring 8 ml. of acetic anhydride. The reaction mixture was stirred for ten minutes in an ice bath at room temperature overnight (about fifteen hours). The reaction mixture was evaporated under reduced pressure to remove the volatile components. The residue was taken up in chloroform and a saturated aqueous solution of sodium bicarbonate. The chloroform layer was separated, evaporated, dried over anhydrous sodium sulfate and evaporated to remove the chloroform. The gummy residue was crystallized from isopropyl acetate-n-hexane and dried in vacuo at 50° C. for two days to yield 6.1 g. of 3,4-dihydro-2(1H)-isoquinolinecarboxamidoxime N,O-diacetate, M.P. 120.5–122° C.

(2) 3,4-dihydro-2(1H)-isoquinolinecarboxamidine O-acetate

To a solution containing 18.17 g. of 3,4-dihydro-2(1H)-isoquinolinecarboxamidoxime in 200 ml. of dry pyridine, cooled to about 5° C., was added dropwise with stirring under dry conditions 3.92 g. of freshly distilled acetyl chloride in 30 ml. of benzene over a period of thirty minutes. The reaction mixture was then stirred for thirty minutes at 0° C. and one hour at room temperature. The solvent was distilled off in vacuo at 35–40° C. and to the residue was added a saturated aqueous solution of sodium bicarbonate. The mixture was extracted four times with a 2 to 1 (v./v.) of benzene-ether. The extract was dried over anhydrous sodium sulfate and evaporated in vacuo to yield an oil which crystallized. The presence of 3,4-dihydro-2(1H)-isoquinolinecarboxamidine O - acetate was confirmed by its infrared spectrum.

Following the procedure of Example C–1 using corresponding molar equivalent quantities of propionic anhydride, butyric anhydride and caproic anhydride in place of acetic anhydride, the following N,O-di-(lower-alkanoates) are prepared: 3,4-dihydro-2(1H)-isoquinolinecarboxamidoxime N,O-dipropionate, 3,4-dihydro-2(1H)-isoquinolinecarboxamidoxime N,O-dibutyrate and 3,4-dihydro-2(1H)-isoquinolinecarboxamidoxime N,O-dicaproate, respectively.

Following the procedure described in Example C–2 using corresponding molar equivalent quantities of N-propionyl chloride, butyryl chloride and caproyl chloride in place of acetyl chloride, there are obtained the following corresponding O-mono-(lower-alkanoates): 3,4-dihydro- 2(1H)-isoquinolinecarboxamidoxime O-propionate, 3,4-dihydro-2(1H)-isoquinolinecarboxamidoxime O-butyrate and 3,4-dihydro-2(1H)-isoquinolinecarboxamidoxime O-caproate.

The hypotensive activity of the 3,4-dihydro-2(1H)-isoquinolinecarboxamidoximes of the invention was determined in unanesthetized renal hypertensive rats using the photo-electric tensometer foot method described by Kersten et al., J. Lab. Clin. Med. 32, 1090 (1947). The method of testing for anti-hypertensive or hypotensive activity is described briefly as follows: The compound is administered orally preferably in the form of its pharmaceutically-acceptable acid-addition salt, e.g., sulfate or p-toluenesulfonate salt, as a solution or suspension in distilled water with the aid of 1% gum tragacanth by stomach tube or subcutaneously to groups of three renal hypertensive rats at each of two to four different dose levels graduated at 0.3 to 0.9 logarithmic intervals. The systolic blood pressure was determined for each of the three rats per dose level before medication and at intervals of 1, 2, 4, 5, 24, and 48 hours after medication. For the control readings, the rats were considered hypertensive if the systolic blood pressure was 160 mm. Hg or greater, and for the post-medication readings, the systolic blood pressure was considered within normotensive range at 130 mm. Hg or less. The blood pressure reading for each rat was compared with these two criteria at each interval and judged either normotensive or not normotensive, and the dose reducing the blood pressure to a normotensive level in 50% of animals was defined as the Approximate Effective Dose$_{50}$ (AED$_{50}$). When tested by the above procedure, the compounds of the invention were found to have hypotensive activity, e.g., 3,4-dihydro-2(1H)-isoquinolinecarboxamidoxime in the form of its p-toluenesulfonate was found to have a subcutaneous AED$_{50}$ of 40 mg./kg.

The actual determination of the numerical biological data definitive for a particular compound is readily obtained according to the above standard test procedure, by technicians versed in pharmacological test procedures, without any need for any extensive experimentation.

The compounds of the invention can be prepared for use by dissolving under sterile conditions a salt form of the compounds in water (or an equivalent amount of a non-toxic acid if the free base is used), or in a physiologically compatible aqueous medium such as saline, and stored in ampules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Also, the compounds can be formulated for oral administration in aqueous alcohol, glycol or oil solutions or oil-water emulsions in the same manner as conventional medicinal substances are prepared. When used as hypotensive agents, they are formulated and used in the same manner as conventional hypotensive agents, such as reserpine preparations, and indeed can be used advantageously in combination with such hypotensive agents, e.g., reserpine, diazoxide, pentolinium, hydralazine, phentolamine, methyldopate, hydrochlorothiazide, chlorothiazide, and the like.

I claim:
1. A member of the group consisting of 3,4-dihydro-2(1H)-isoquinolinecarboxamidoxime, its O-mono-(lower-alkanoate) and its N,O-di-(lower-alkanoate).
2. 3,4-dihydro-2(1H)-isoquinolinecarboxamidoxime according to claim 1.
3. 3,4-dihydro-2(1H)-isoquinolinecarboxamidoxime O-acetate according to claim 1 where O-mono-(lower-alkanoate) is O-acetate.
4. 3,4-dihydro-2(1H)-isoquinolinecarboxamidoxime N,O-diacetate according to claim 1 where N,O-di-(lower-alkanoate) is N,O-diacetate.
5. A compound of the formula:

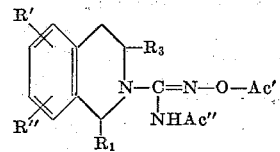

where $R_1$ and $R_3$ are each hydrogen or lower-alkyl, $R'$ and $R''$ are each hydrogen, lower-alkyl, lower-alkoxy or halo, and $Ac'$ and $Ac''$ are each hydrogen or lower-alkanoyl, where lower-alkyl, each occurrence, is primary or secondary.
6. 3,4-dihydro-1-methyl-2(1H)-isoquinolinecarboxamidoxime according to claim 5 where $R'$, $R''$, $Ac'$, $Ac''$ and $R_3$ are each hydrogen and $R_1$ is methyl.
7. 3,4-dihydro-3-methyl-2(1H)-isoquinolinecarboxamidoxime according to claim 5 where $R'$, $R''$, $Ac'$, $Ac''$ and $R_1$ are each hydrogen and $R_3$ is methyl.
8. 3,4-dihydro-6,7-dimethoxy-2(1H)-isoquinolinecarboxamidoxime according to claim 5 where $R_1$, $R_3$, $Ac'$ and $Ac''$ are each hydrogen, and $R'$ and $R''$ are each methoxy at the 6-position and 7-position respectively of the isoquinoline ring.

References Cited
UNITED STATES PATENTS

| | | | |
|---|---|---|---|
| 2,947,782 | 8/1960 | De Benneville et al. | 260—566 X |
| 2,951,843 | 9/1960 | Haack et al. | 260—288 |
| 2,970,145 | 1/1961 | De Benneville | 260—566 X |
| 3,169,989 | 2/1965 | Tieman et al. | 260—566 |
| 3,291,799 | 12/1966 | Wenner | 260—288 X |
| 3,314,963 | 4/1967 | Koch | 260—288 |

DONALD G. DAUS, Primary Examiner

U.S. Cl. X.R.

260—283, 286, 288, 289; 424—258

PO-1050
(5/69)

UNITED STATES PATENT OFFICE
CERTIFICATE OF CORRECTION

Patent No. 3,505,336          Dated April 7, 1970

Inventor(s) Denis M. Bailey

It is certified that error appears in the above-identified patent and that said Letters Patent are hereby corrected as shown below:

Column 1, line 46, "hyptertensive" should read --hypertensive--. Column 4, line 7, "-isoquinolinecarbonitrile" should read -- -isoquinolinecarbonitriles --. Column 5, line 15, "-p-tol" should read -- p-tol --; line 60, "2(-H)" should read --2(1H)--; line 63, "-isoquinolinecarboxamidoximes," should read -- -isoquinolinecarboxamidoximes: --.

SIGNED AND
SEALED
AUG 18 1970

(SEAL)
Attest:

Edward M. Fletcher, Jr.
Attesting Officer

WILLIAM E. SCHUYLER, JR.
Commissioner of Patents